Jan. 17, 1933.　　　　G. KUHN　　　　1,894,876
ILLUMINATING DEVICE
Filed Jan. 23, 1930　　3 Sheets-Sheet 1

Inventor
George Kuhn

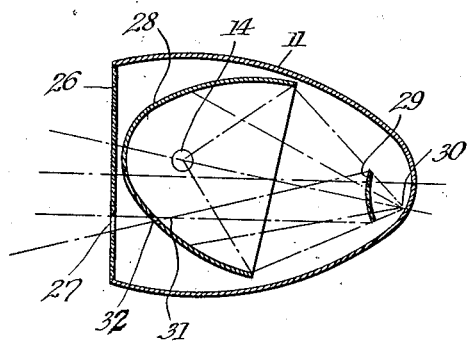
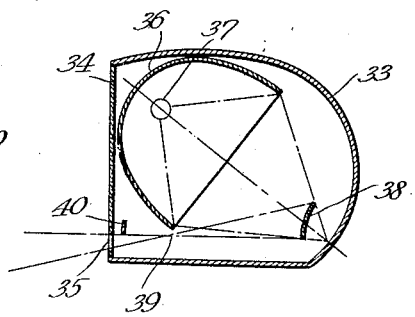
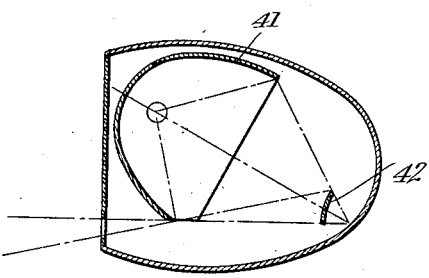
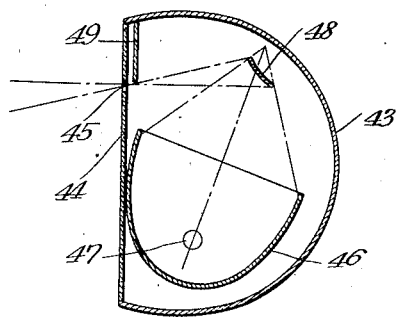
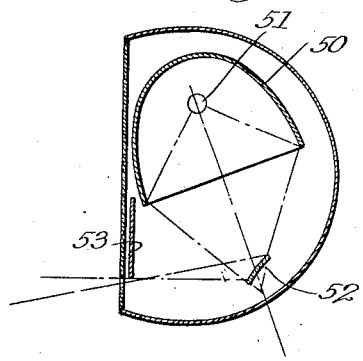
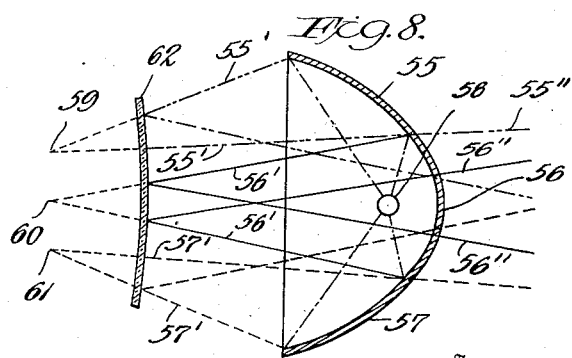
Inventor
George Kuhn Jan. 17, 1933.  G. KUHN  1,894,876
ILLUMINATING DEVICE
Filed Jan. 23, 1930   3 Sheets-Sheet 3
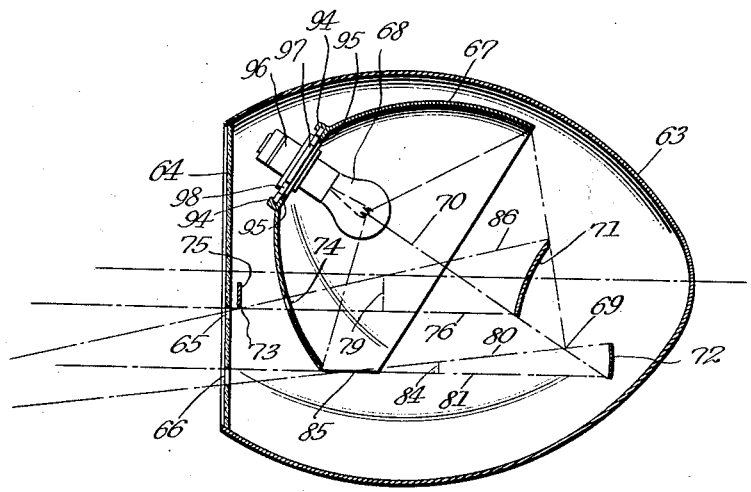
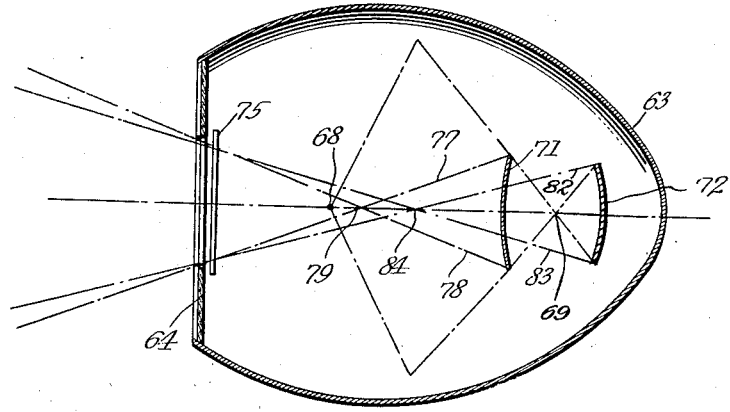
Inventor
George Kuhn Patented Jan. 17, 1933

1,894,876

UNITED STATES PATENT OFFICE

GEORGE KUHN, OF SILVER SPRING, MARYLAND, ASSIGNOR TO BUTLER-KUHN CORPORATION, OF WASHINGTON, DISTRICT OF COLUMBIA, A CORPORATION OF DELAWARE

ILLUMINATING DEVICE

Application filed January 23, 1930. Serial No. 422,960.

The present invention relates to light projecting means comprising, in general, a mirror, or system of mirrors, so arranged relative to a source of light as to project rays from the latter, and masking means so arranged relative to the source and reflecting means as to hide them from the normal point of view. The invention is particularly adapted for embodiment in the headlights of automobiles and when so embodied a beam is projected whose top rays are substantially on the horizontal and the light bulb and reflecting surfaces are concealed from any point of view above the horizontal plane of the top rays. Thus, while perfect illumination is secured, glare is entirely eliminated.

I have shown a number of illustrative embodiments of my invention in the accompanying drawings wherein:

Figure 3 is a similar section of a headlight embodying a third modified form of the invention.

Figure 4 is a similar section of a headlight embodying a fourth form of the invention.

Figure 5 is a similar section of a headlight embodying a fifth form of the invention.

Figure 6 is a similar section of a headlight embodying a sixth form of the invention.

Figure 7 is a similar section of a headlight embodying a seventh form of the invention.

Figure 8 is a horizontal section of a still further light and mirror combination.

Figure 9 is a vertical section of a headlight embodying my invention in its preferred form.

Figure 10 is a horizontal section of Figure 9, with parts omitted.

Figure 1:
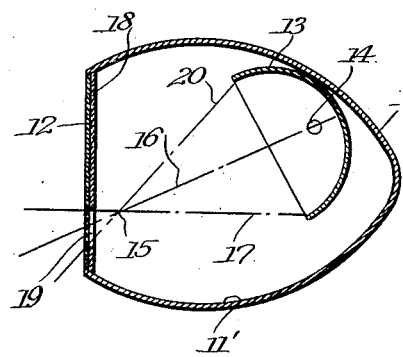
Figure 1 is a vertical axial section of a headlight embodying my invention in its simplest form.

Referring now to the drawings, and first of all to Figure 1, reference numeral 11 designates a headlight casing provided at its open end with a closure element 12 of clear glass. In the upper rear portion of the casing is mounted a mirror or reflector 13 which is in the shape of a portion of a prolate ellipsoid of revolution, an electric light bulb 14 being disposed within the mirror which latter concentrates rays reflected from the bulb at a focus 15. The axis 16 of the mirror is so inclined that the lowermost ray 17 projected thereby is substantially on the horizontal. A sheet of light obscuring material 18 is disposed immediately behind plate 12, and is provided with a slot 19 whose upper edge terminates downwardly in the horizontal plane of ray 17. The aperture 19 is of sufficient size to permit the passage therethrough of upper ray 20 and also of the lateral rays, all the rays, of course, passing through aperture 19 in diverging relation to each other, inasmuch as the aperture is situated beyond focus 15. Plate 18 is preferably opaque, and inasmuch as the upper edge of slot 19 meets the lowermost ray 17 projected by mirror 13, it will be evident that the mirror will be completely obscured from any point of view above ray 17.

Thus, due to the converging and crossing of the top and bottom rays and to the relative positions of mirror 13 and mask 18, the mirror and light will be hidden from any normal point of view, but at the same time, a beam having a substantially horizontal portion will be projected, thus illuminating areas at large distances in advance of the headlight. The lower, inner, portion 11' of the casing is preferably rendered non-light-reflecting.

Figure 2:
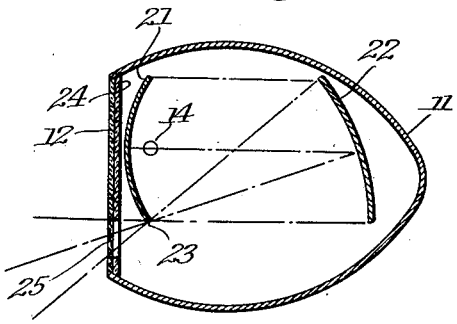
Figure 2 is a similar section of a headlight embodying a modified form of the invention.

In Figure 2, reference numeral 11 again indicates the headlight casing and 12 the closure plate of clear glass. According to this embodiment, however, a primary, parabolic mirror 21 is arranged in the upper forward portion of the casing and projects rays from source 14 upon a secondary, concave mirror 22 disposed in the upper rear portion of the casing. This concave mirror is so positioned and shaped as to converge the rays projected thereby at a focus 23 within the headlight casing. In this embodiment, mirror 21 itself serves as a mask for mirror 22, and completely hides the latter from the normal point of view. A translucent plate 24 having an aperture 25 may be positioned immediately behind plate 12, and this backing plate may have any desired color. Diffused light within the casing will pass through and illumine the backing plate so as to outline the front face of the headlight. Plate 24, however, may be entirely omitted, if desired.

According to Figure 3, the casing 11 has its forward end closed by a translucent plate 26 provided with an aperture or transparent portion 27. An ellipsoidal mirror 28 is arranged on a downwardly inclined axis to project rays from bulb 14 rearwardly upon a substantially upright convex mirror 29 arranged somewhat in advance of focal point 30. Theoretically, mirror 29 might be arranged at focal point 30, but to prevent overheating of the mirror it is desirable to arrange it somewhat in the relation shown. The nearer the bulb the larger the mirror must be, and the nearer the top rays projected by it would approach the vertical and thus be substantially useless. All things considered, I have found that it is desirable to make mirror 29 of as small size as is consistent with preventing overheating due to its proximity to focus 30.

The upper and lower rays projected by mirror 29 are crossed at 31, and pass through an aperture 32 in mirror 28 and through space 27 of translucent plate 26. In this instance also, it will be noted that a portion of mirror 28 serves to obscure mirror 29. If desired, plate 26 may be of clear glass.

In Figure 4, a casing 33 is closed at its forward end by means of a translucent plate 34 having in its lower portion an aperture 35. An ellipsoidal mirror 36 in the upper forward part of the casing is tilted to project rays from source 37 upon a substantially upright convex mirror 38, the rays projected by the latter being crossed at 39 to pass through aperture 35. A mask 40 is arranged behind and spaced from plate 34 to obscure such portion of mirror 38 as is not hidden by mirror 36.

The arrangement according to Figure 5 is substantially the same as that of Figure 4 with the exception that the relative arrangement of the primary and secondary mirrors 41 and 42 is such that a portion of the former may be outlined to mask the latter entirely.

According to Figure 6, a casing 43 has its forward end closed by means of a translucent plate 44 provided in its upper portion with an aperture 45. An ellipsoidal mirror 46 positioned in the lower portion of the casing is arranged to project rays from source 47 upon a convex mirror 48 disposed in the upper part of the casing. An opaque mask 49 is arranged to the rear of plate 44 to hide mirror 48.

Figure 7 shows an inverted arrangement of the parts of Figure 6, the primary mirror 50 and source 51 being arranged in the upper part of the casing and the secondary mirror 52 in the lower part thereof and hidden by mask 53.

According to the horizontal section of Figure 8, the primary mirror 54 is composed of three sections 55, 56 and 57 so shaped and arranged relative to bulb 58 as to focus their reflected rays at spaced points 59, 60, and 61. A convex mirror 62 is arranged in front of the focal points and the rays projected from mirrors 55 to 57 define, in effect, a band on mirror 62. The lateral bounding rays of the beams projected by the respective mirror portions 55, 56 and 57 have been indicated by distinguishing lines, these lines being designated 55', 56' and 57' respectively. Similarly, the lateral bounding rays of the beams projected by mirror 62 have been designated 55'', 56'' and 57''. Due to the fact that the rays projected by mirror 54 impinge upon mirror 62 over a wide lateral extent the heating effect on mirror 62 is minimized, so that this arrangement is useful where a particularly hot source of illumination is provided, or in various other situations. The vertical curvature of mirror 62 is such as to give the effect shown in Figures 1 to 7, wherein the top and bottom rays projected by the secondary mirror are converged and crossed, the rays projected by the lowermost portion of the mirror being substantially on the horizontal.

According to Figures 9 and 10, a casing 63 has its open end closed by means of a translucent plate 64 provided at its lower portion with vertically spaced apertures 65 and 66, or the plate may be of transparent clear glass, in which case the apertures are unnecessary. An ellipsoidal mirror 67 is mounted in the upper forward portion of the casing with its axis so inclined as to converge rays reflected from bulb 68 at a point 69. Reference numeral 70 denotes the axis of primary mirror 67, and it will be noted that I have provided a pair of secondary mirrors 71 and 72, respectively, both terminating downwardly, and throughout their widths, at axis 70 in vertically spaced horizontal planes.

Mirror 71 is of convex form and is disposed in front of point 69 so as to receive all of the projected rays above axis 70. This mirror is so curved horizontally as to converge and cross the lateral rays 77 and 78 on a vertical line indicated at 79, and is so curved vertically as to converge and cross the top and bottom rays 86 and 76 on a horizontal line indicated at 73, line 73 being beyond line 79. The projected beam is thus more concentrated in the vertical than in the horizontal direction, so that while as little light as possible is wasted in a downward direction, wide lateral illumination is afforded.

Beyond line 79 the beam passes through an aperture 74 in mirror 67 and beyond line 73 through aperture 65. An opaque masque 75, located no nearer mirror 71 than line 73, terminates downwardly in a straight edge at the horizontal beam 76 to hide any portion of mirror 71 which might otherwise be visible through aperture 74. Apertures 65 and 74 are in the form of horizontally extending slots.

Mirror 72 is positioned beyond point 69 to receive the rays projected by mirror 67 below axis 70, and is of concave form since it must converge rays which, beyond point 69, are divergent. The top and bottom rays 80 and 81 projected by this mirror are convergent at 85, and pass immediately below the lower edge of mirror 67 and emerge through horizontally elongated aperture 66. The lateral rays 82 and 83, Figure 10, are crossed at 84. The lower portion of mirror 67 serves to obscure mirror 72 from any point of view above the horizontal plane of rays 81. Mirror 72 is so curved as to secure a similar relation of lines of ray convergence to that described in connection with mirror 71. The outlines of mirrors 71 and 72 may be as desired, so long as their surfaces are sufficient to intercept the beam portions as described and so long as their bottom edges terminate substantially in the horizontal planes of the horizontal rays projected thereby.

Referring to Figure 1, for example, the lowermost ray 17 viewed geometrically, is an element of the cone of light projected by mirror 13. The field of that portion of the beam above axis 16 and beyond point 15 is in the form of a semi-ellipse with its diameter on the horizontal and ray 17 at the top.

According to the embodiment of Figure 9, however, it will be evident that the beam projected by mirror 71, is substantially semi-conical and its field beyond point 73 is in the form of a semi-ellipse reversed in position as regards the semi-elliptical field discussed with reference to Figure 1, so that the beam will be broad at its top instead of at its bottom. Thus, the dense and most effective position of the beam being at the top, clear illumination is secured for a greater distance ahead than would otherwise be possible. The field of mirror 72 will be the same as that of mirror 71.

I have stated the position of mirrors 71 and 72 to be "substantially upright". It is to be understood that this expression merely means that the mirrors are so arranged in a generally upright position, as to be able to project a beam whose bottom rays (i. e. between the mirror and locality of convergence with the top rays), are substantially horizontal. The expression, it will be noted, applies to all the illustrated embodiments of the invention wherein a secondary mirror is shown.

Due to the position of mirror 67 within casing 63, it is apparent that it would be practically impossible to replace a bulb 68 in an ordinary socket. To avoid this difficulty mirror 67 is provided with a circular aperture concentric with its axis 70 and large enough to pass a bulb 68. The marginal area of the mirror, which will ordinarily be of metal, has portions struck up to form fingers as at 94, the intermediate portions 95 being bent over to lie in a plane normal to axis 70. A socket 96 has secured to it a circular radial flange 97 provided with peripheral recesses as at 98, spaced to register with fingers 94. Thus, flange 97, upon insertion of the bulb through the mirror aperture, may be seated on the ledge formed by portions 95 and turned slightly to engage its full peripheral portions under fingers 94. The connection thus formed is in the nature of a bayonet joint.

Figure 11:
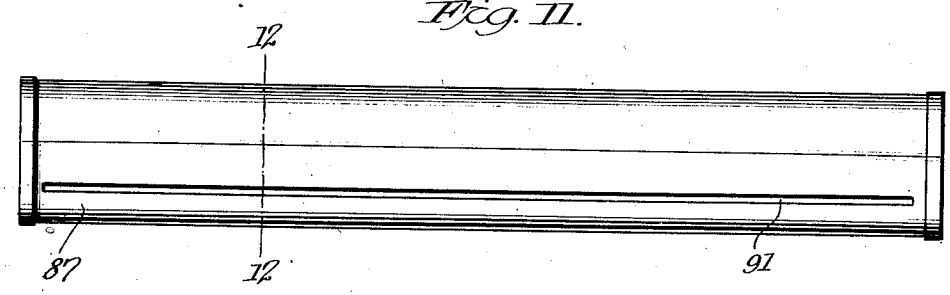
Figure 11 is a front elevation of a further modified form of the invention.
Figure 12:
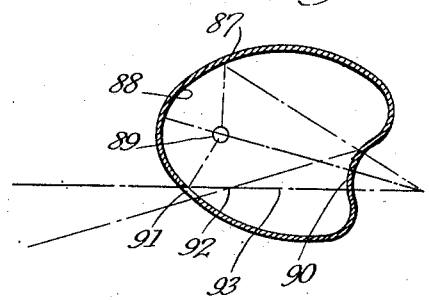
Figure 12 is a section of line 12—12 of Figure 11.

Figures 11 and 12 illustrate an embodiment of the invention in the form of a flood light adapted for use whenever such a type of light is required. For example, such a light may be used for stage or show-window illumination, for street lighting, or flying field illumination, and in each instance will bring with it the advantages heretofore discussed. According to these figures, reference numeral 87 designates an elongated horizontally disposed tubular sheet metal shell having its walls conformed to present an elliptical reflecting surface 88 in front of a series of bulbs 89 arranged along a line parallel to the axis of the shell, and a convex reflecting surface 90 to the rear of the bulbs. The rays received by mirror 90 from mirror 88 are projected by the latter through a horizontal slot 91, being crossed along a line 92. The rear and bottom interior surfaces of the casing are rendered non-light-reflecting below the horizontal rays 93. The forward portion of the shell terminates downwardly at plane of rays 93 at or beyond line 92.

It will be evident from the description that the invention may be embodied in a large number of different forms without departing from its scope, and it will also be evident that some of the illustrated forms might be combined. For example, it is within the purviews of the invention to use primary and secondary mirrors such as are shown in Figure 8 in the combination such as is shown in Figures 9 and 10 if a laterally concentrated beam is required. Figures 3 to 7 point to the fact that the relative arrangement of the various elements may be considerably varied in applying the invention to various forms of headlight casings, and that in any event the usual form of casing may be retained. Further, the light opening of the casing may be provided with a glass closure of such nature as to give the appearance of the ordinary headlight. Any masking means, such as shown at 75, Figure 9, for example, will be spaced from the closure a sufficient distance so as not to throw a noticeable shadow thereon. Again, the closure may be of frosted glass, save for that portion through which the light beam must pass, this latter portion being left clear. Being projected through clear glass (or through a free aperture), the strength of the beam is unimpaired. While the beam thus emerges at full strength and supplies brilliant illumination, the lamp and reflecting surfaces are completely concealed from the normal point of view, so that there is no blinding effect whatever.

While I have described my improved illuminating device as projecting a beam bounded at its top by a horizontal plane above which the bulb and reflecting elements are invisible, it will be understood that this language is used as a matter of convenience, and does not exclude the idea of positioning the device so that, for example, the bulb and reflecting elements are invisible from one side of a vertical plane. This effect would be secured, if the casing of Figure 9, for example, were turned through 90° about its longitudinal axis.

I claim:

1. The combination with a source of light, of means for projecting a beam with the source and all projecting means entirely concealed, said projecting means comprising an ellipsoidal mirror and a secondary mirror, said ellipsoidal mirror being arranged relative to the source to project rays emanating therefrom on the secondary mirror, said secondary mirror being arranged in substantially upright position adjacent the point of convergence of the rays projected by the ellipsoidal mirror to re-project the rays past and clear of the source and past the ellipsoidal mirror with the rays projected from the lowermost portion of the secondary mirror substantially on the horizontal, said secondary mirror being vertically curved to converge and cross at a sharp angle the top and bottom rays projected thereby, and light obstructing means arranged in front of the secondary mirror no nearer the latter than the locality of ray convergence and extending downwardly substantially to the bottom of the secondary mirror to terminate immediately above the horizontal rays whereby the secondary mirror is obscured from any point of view above the horizontal plane of its lowermost reflecting portion, said light obstructing means not affecting the cross section of the beam projected by the secondary mirror.

2. The combination with a source of light, of means for projecting a beam with the source and all projecting means entirely concealed, said means comprising a primary mirror curved and arranged relative to the source to project a beam whose top and bottom rays are convergent, a substantially upright secondary mirror positioned to receive said beam and re-project the rays past and clear of the source and past the primary mirror with the rays projected by the lowermost portion thereof substantially on the horizontal, said secondary mirror being shaped to converge and cross the top and bottom rays projected thereby, and light obstructing means comprising a portion arranged in front of the secondary mirror no nearer the latter than the locality of convergence of the rays projected thereby and extending downwardly substantially to the bottom of said secondary mirror to terminate immediately above said horizontal rays whereby said secondary mirror is obscured from any point of view above the horizontal plane of its lowermost reflecting portion, said light obstructing means not affecting the cross section of the beam projected by the secondary mirror.

3. Structure according to claim 2 wherein the light obstructing means is constituted entirely by the primary mirror.

4. Structure according to claim 2 wherein the secondary mirror is also shaped to converge and cross the lateral rays projected thereby.

5. The combination with a source of light, a primary mirror curved to project a beam having top and bottom convergent rays, a pair of substantially upright secondary mirrors arranged in the path of said beam, one of said secondary mirrors being positioned in front of the locality of convergence of the rays projected by the primary mirror and terminating downwardly substantially at the longitudinal axis of the beam and in a horizontal plane, the other of said secondary mirrors being positioned behind said locality of ray convergence and terminating downwardly at said axis in a second horizontal plane vertically removed from the first, said secondary mirrors being positioned to re-project the rays received thereby past the source with the rays projected by the lowermost portions thereof substantially on the horizontal, each secondary mirror being shaped to converge and cross the top and bottom rays projected thereby, and light obstructing means in front of the secondary mirrors and obscuring each from any point of view above the horizontal plane of the uppermost horizontal rays projected thereby while permitting the unobstructed passage of the projected beams.

6. Structure according to claim 5 wherein the entire light obstructing means for one of the secondary mirrors is constituted by the primary mirror.

7. Structure according to claim 5 wherein the secondary mirrors are shaped to converge and cross the lateral rays projected thereby.

8. The combination with a source of light, of an ellipsoidal mirror arranged on an axis inclined to the horizontal, a substantially upright secondary mirror in front of said ellipsoidal mirror, the ellipsoidal mirror projecting rays emanating from the source upon said secondary mirror, said secondary mirror being spaced from the point of convergence of the rays projected by said ellipsoidal mirror and terminating downwardly at said axis and in a horizontal plane, said secondary mirror being positioned to reproject the rays received thereby past the source with the rays projected by the lowermost portion thereof defining a substantially horizontal plane, said secondary mirror being shaped to converge and cross the top and bottom rays projected thereby, and light obstructing means arranged in front of the secondary mirror no nearer the latter than the locality of ray convergence and extending downwardly substantially to the bottom of the secondary mirror to terminate in a horizontal line immediately above said horizontal plane whereby the secondary mirror is obscured from any point of view above said horizontal plane.

9. Structure according to claim 8 wherein the secondary mirror is vertically convex and is positioned in front of the converging point of the rays projected by the ellipsoidal mirrors.

10. Structure according to claim 8 wherein the secondary mirror is vertically concave and is positioned behind the converging point of the rays projected by the ellipsoidal mirror.

11. Structure according to claim 8 wherein the entire light obstructing means is constituted by the ellipsoidal mirror.

12. Structure according to claim 8 wherein the secondary mirror is also shaped to converge and cross the lateral rays projected thereby.

In testimony whereof I have hereunto set my hand.

GEORGE KUHN.